US011971156B1

(12) United States Patent
Ketterling

(10) Patent No.: US 11,971,156 B1
(45) Date of Patent: Apr. 30, 2024

(54) LIGHT SOCKET AND CABLE CLIP

(71) Applicant: Kody J. Ketterling, Twin Falls, ID (US)

(72) Inventor: Kody J. Ketterling, Twin Falls, ID (US)

( * ) Notice: Subject to any disclaimer, the term of this patent is extended or adjusted under 35 U.S.C. 154(b) by 0 days.

(21) Appl. No.: 18/331,850

(22) Filed: Jun. 8, 2023

(51) Int. Cl.
*F21V 21/088* (2006.01)

(52) U.S. Cl.
CPC ........ *F21V 21/088* (2013.01); *F21V 21/0885* (2013.01)

(58) Field of Classification Search
CPC ........................... F21V 21/088; F21V 21/0885
See application file for complete search history.

(56) References Cited

U.S. PATENT DOCUMENTS

| | | | | |
|---|---|---|---|---|
| 10,180,242 | B2 * | 1/2019 | Schreiber | F21S 4/10 |
| 2020/0124067 | A1 * | 4/2020 | Chi Man | G09F 7/18 |
| 2021/0145148 | A1 * | 5/2021 | Wise | A45D 40/04 |
| 2022/0010946 | A1 * | 1/2022 | Chen | F21V 17/164 |

* cited by examiner

*Primary Examiner* — Evan P Dzierzynski
*Assistant Examiner* — Nathaniel J Lee
(74) *Attorney, Agent, or Firm* — Burdick Patents, P.A.; Sean D. Burdick; Colin L. Honan

(57) ABSTRACT

A combination light socket and cable clip removably attaches to a variety of surfaces on a structure and removably attaches a variety of light sources to the clip. The clip has a stabilizing plate which has a guiding flap formed at one end and a post formed at an opposite end. A flexible multi-clip structure extends from the post toward the stabilizing plate. The flexible multi-clip structure includes means for clamping the clip to a structure, means for removably attaching electrical wire to the clip, and means for removably attaching a lightbulb socket to the clip. The clip may be injection molded using biodegradable materials and is useful for hanging lights from roof gutters and shingles.

18 Claims, 3 Drawing Sheets

LIGHT SOCKET AND CABLE CLIP

BACKGROUND OF THE INVENTION

Field of the Invention

The present invention relates generally to clips for securing lights to a structure, and, in particular, to a clip for removably attaching a variety of lights to a variety of different surfaces.

Description of Related Art

Light clips for removably securing a light source to a structure are well known in the art. The specific design of a light clip may depend on the type of light source as well as the structure to which it attaches. These conventional light clips are typically limited to receiving one type of light source and having a specific design for engagement with a specific portion of the structure, e.g., to a gutter or between the shingle and roof. Typically, the light clips are made from a durable plastic material to withstand prolonged exposure in the environment.

A downside to the conventional light clips occurs when a user needs to mount different sizes and types of lights and must acquire and carry many different types of clips corresponding to the many different types of light being hung. During installation of lights, when an installer moves among precarious positions on and about the structure, e.g., among ladders, rooftops, and branches of trees, having to carry and select from among different types of clips can be particularly troublesome, especially when the installer's hands are otherwise occupied to ensure safety. This can be particularly burdensome when hanging long strings of lights from large structures such as multi-story homes or commercial buildings.

Thus, what is needed is a more versatile light clip that can attach many different light sources to many different structures.

SUMMARY OF THE INVENTION

A light socket and cable clip is disclosed herein. A light socket and cable clip according to the present invention (a.k.a. light clip) can be deployed in a variety of manners to be removably attached to a variety of surfaces on a structure. For example, the light clip may be removably attached to a gutter that is secured to the edge of a roof. Alternatively, the light clip may be removably attached directly to shingles on the roof in cases where the roof has no gutters or where it is desired to hang lights from a portion of the roof that has no gutters. The light clip can be used to removably hang different types of light sources from the structure.

In one embodiment, the light clip has a stabilizing plate with a guiding flap at a first end. Opposite the guiding flap, a post extends from the stabilizing plate. A flexible multi-clip structure extends from the post toward the stabilizing plate. The flexible multi-clip structure includes a means for clamping the light clip to a flat surface. The flat surface can be a portion of a gutter attached to a roof or a shingle on the roof or any other flat surface where it might be desirable to hang a light source. The flexible multi-clip structure further includes a means for removably attaching an electrical wire to the light clip and a means for removably attaching a lightbulb socket to the light clip.

In preferred embodiments, the light clip is manufactured from a biodegradable material. Preferably, the light clip is injection molded, according to known molding techniques, using a mixture of biodegradable materials.

In some embodiments, the guiding flap is angled with respect to the horizontal axis of the stabilizing plate. The guiding flap preferably angles downward from the stabilizing plate. The post can also be angled with respect to the horizontal axis of the stabilizing plate. In some embodiments, the post forms an angle with the stabilizing plate that is between 45 to 85 degrees. Preferably, the post extends upwards from the stabilizing plate.

The flexible multi-clip structure can include a flexure extending from the post towards the stabilizing plate. The clamping means preferably comprises the flexure being in resiliently flexible contact with the stabilizing plate. A first handle may be formed at the end of the flexure. The first handle may be utilized by a user to flex or bias the flexure away from the stabilizing plate to thereby create an open space therebetween. The flat surface can thereafter be positioned in the open space and the flexure released to clamp the flat surface between a portion the stabilizing plate and a portion of the flexure.

The flexible multi-clip structure can further include a wire clamp integrally formed with the flexure. The wire clamp is preferably formed on a top surface of the flexure. The electrical wire removable attachment means preferably comprises the wire clamp being in resiliently flexible contact with the flexure. In some embodiments, the wire clamp can include a second handle extending forward therefrom. The second handle is useful for biasing the wire clamp away from the flexure to create an open space where the electrical wire can be received.

In some embodiments, the lightbulb socket removable attachment means can include a socket clamp extending from the post. Preferably, the socket clamp is formed as an integral extension from the post and extends in a direction away from the stabilizing plate. The socket clamp can include a pair of receiving wings that enclose a receiver. The receiving wings are resiliently flexible and configured to flex away from one another to open up the receiver. The receiver is configured to frictionally engage a lightbulb socket of a light source. In preferred embodiments, the inner diameter of the receiver is substantially equal to the outer diameter of the lightbulb socket.

In an alternative embodiment according to the present invention, a biodegradable light clip is disclosed. The biodegradable clip is preferably injection molded from one or more biodegradable materials. The biodegradable clip has a plate with an angled guiding flap extending from one end and a post extending from the opposite end. A flexible multi-clip structure is integrally formed with and extends from the post. The multi-clip structure has a socket clamp extending in a first direction and a flexure extending from a second, opposite direction. A wire clip is integrally formed as an extension of the top surface of the flexure. Preferably, the post is resiliently flexible to allow a user to flex or bias the flexure away from the plate. Further, the flexure is configured to be in resiliently flexible contact with the plate.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments of a light socket and cable clip. The light socket and cable clip is an engineered solution overcoming the numerous downsides of prior art light clips. The light socket and cable clip has a variety of means for removably attaching a variety of light sources to the clip. Further, the light socket and cable clip is designed to have at least two different means with which it can be attached to a structure. In preferred embodiments of the light socket and cable clip, the clip is made from biodegradable materials. In such embodiments, the light socket and cable clip is made according to conventional injection molding methods using a mixture of biodegradable polymer materials. These and other aspects of the disclosed invention will become apparent to those skilled in the art in view of the following descriptions.

Figure 1:
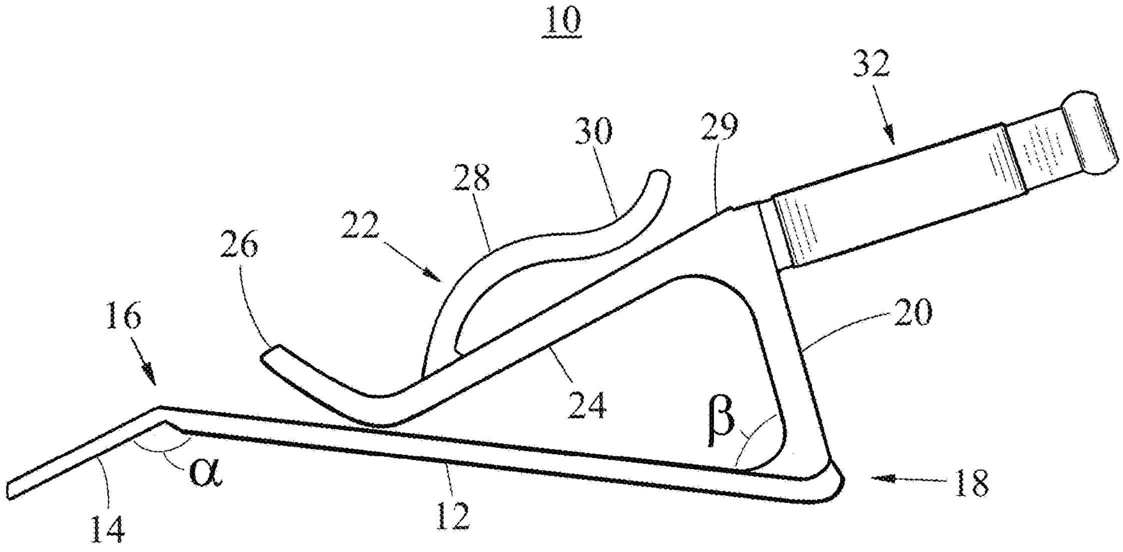
FIG. 1 is a side view of one embodiment of a light socket and cable clip according to the present invention.

FIG. 1 is a side view of one embodiment of a light socket and cable clip 10, hereinafter just light clip 10, according to present inventive concepts. The light clip 10 has a stabilizing plate 12 with a guiding flap 14 integrally formed at a first end 16 of the plate. Opposite the first end 16, a second end 18 of the stabilizing plate 12 is integrally formed with a post 20. In preferred embodiments, the guiding flap 14 has an angle $\alpha$ with respect to the horizontal axis of the stabilizing plate 12. The angle $\alpha$ is preferably between 5 to 30 degrees and extends the guiding flap 14 downward from the horizontal axis of the stabilizing plate 12. Similarly, the post 20 forms an angle $\beta$ with respect to the horizontal axis of the stabilizing plate 12. The post 20 preferably extends upwards from the horizontal axis of the stabilizing plate 12 forming angle $\beta$ between 45 and 80 degrees.

Extending from the post 20 is a multi-clip structure 22. Preferably, the multi-clip structure 22 is flexible and can resiliently flex away from the stabilizing plate 12. The multi-clip structure 22 includes a means for clamping the light clip 10 to a structure, e.g., gutters on the edge of a roof, shingles of a roof, etc. In preferred embodiments, the clamping means includes a flexure 24 extending from the post 20 towards the stabilizing plate 12. Formed at a terminal end 23 of the flexure 24 is a first handle 26. The first handle 26 may be used to flex the flexure 24 away from the stabilizing plate 12 during installation or removal of the light clip 10 to a structure. Due to the resiliently flexible nature of the multi-clip structure 22, the flexure 24 is able to be biased away from the stabilizing plate 12 such that the light clip 10 may be removably attached to a structure, as explained in more detail below with regard to FIGS. 6 and 7.

For instance, the flexure 24 may be biased away from the stabilizing plate 12 such that an upper edge of a gutter on a roof may be positioned between the flexure and the stabilizing plate 12. Release of the flexure 24 once the light clip 10 has been positioned on a structure causes the structure to be clamped between the stabilizing plate 12 and the flexure. Alternatively, the guiding flap 14 may be used to slide and position the stabilizing plate 12 under a portion of a structure, e.g., a shingle on a roof. In such attachments, the shingle will be clamped between the flexure 24 and the stabilizing plate 12. The angle $\alpha$ of the guiding flap 14 assists in clamping the light clip 10 between the shingle by biassing the stabilizing plate 12 upwards off the roof toward the shingle. The slight angle of the stabilizing plate 12 increases the friction generated between the plate and the shingle to aid in securement of the light clip 10 to the structure.

The multi-clip structure 22 also includes means for removably attaching electrical wire to the light clip 10 and means for removably attaching a lightbulb socket to the light clip. The electrical wire removable attachment means preferably includes a wire clamp 28 extending from an outer surface 29 of the flexure 24. The wire clamp 28 is preferably resiliently flexible so as to allow an operator to flex the clamp open and position a portion of the electrical wire therein. The wire clamp 28 can include a second handle 30 extending from one end thereof that is useful in flexing the wire clamp 28 away from the outer surface 29 so that an electrical wire may be positioned in the clamp. In preferred embodiments, the wire clamp 28 is formed as an integral extension from the flexure 24. In alternate embodiments, the wire clamp 28 may be a separate piece that is connected to the flexure 24, for instance by adhesive bonding.

Figure 2:
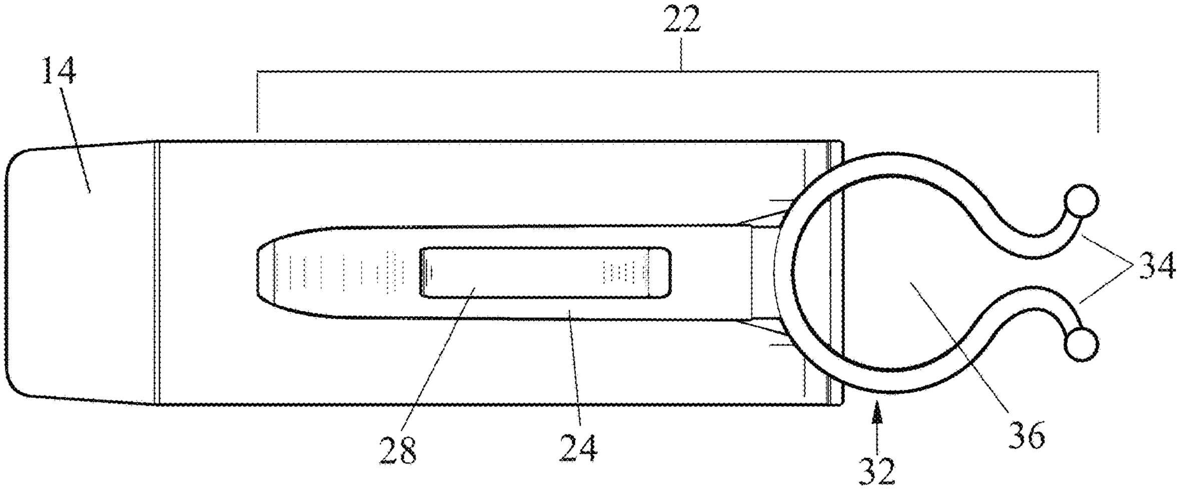
FIG. 2 is a top view of an embodiment of a light socket and cable clip.

FIG. 2 is a top view of the light clip 10 according to one embodiment of the present disclosure. The lightbulb socket removable attachment means can include a socket clamp 32 integrally extending from the post 20. Preferably, the socket clamp 32 extends forward from the post away from the stabilizing plate 12. The socket clamp 32 has a pair of opposing, flexible receiving wings 34 which resiliently enclose a receiver 36. The receiver 36 is designed to frictionally engage the outer diameter of a lightbulb socket of a light source. In preferred embodiments, the receiver 36 is circular and has an internal diameter substantially equal to an outer diameter of the lightbulb socket. Thus, the size of the receiver 36 may vary depending on the size of lightbulb sockets that it will be engaged with. The receiving wings 34 are configured to flex outwards from one another as a lightbulb socket is pressed into the receiver 36. The receiving wings 34 return to their original position, or as close as possible to the original position depending on the size of the lightbulb socket once the lightbulb socket has been sufficiently engaged with the receiver 36.

Figure 3:
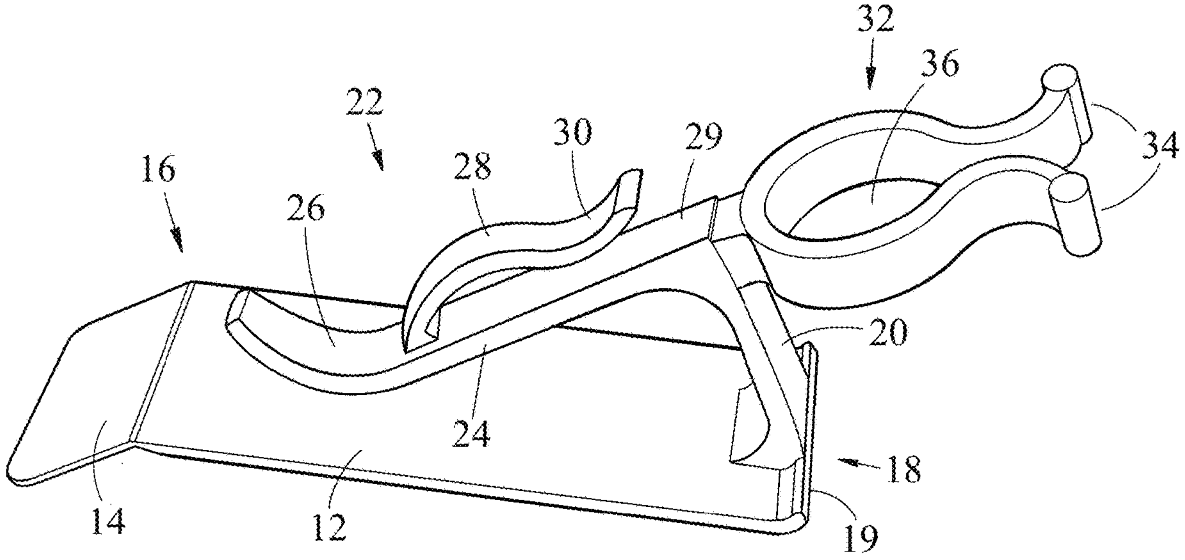
FIG. 3 is a side perspective view of an embodiment of a light socket and cable clip.

FIG. 3 is a side perspective view of an embodiment of the light clip 10 according to the present invention. In some embodiments, the second end 18 of the stabilizing plate 12 has a rounded edge 19. The rounded edge 19 aids in the stabilizing plate 12 smoothly sliding across an uneven surface without becoming snagged or otherwise engaged with the uneven surface.

Figure 4:
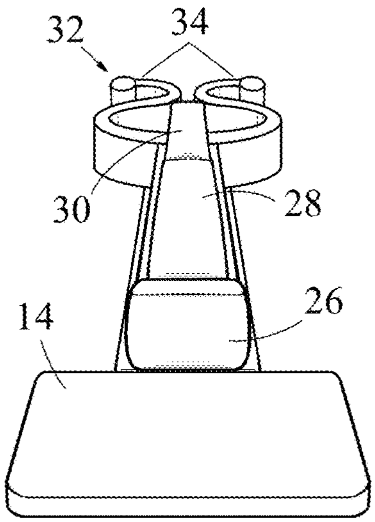
FIG. 4 is a rear perspective view of an embodiment of a light socket and cable clip.
Figure 5:
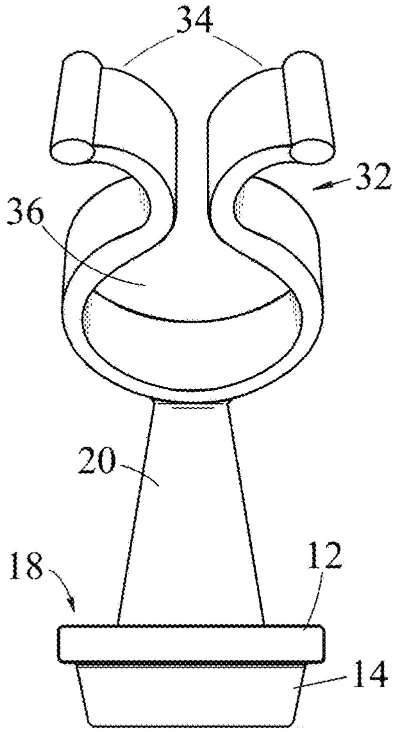
FIG. 5 is a front perspective view of an embodiment of a light socket and cable clip.

FIG. 4 is a rear perspective top view of the light clip 10. In particular, FIG. 4 places the guiding flap 14 in the horizontal plane such that the stabilizing plate 12 is no longer visible due to the angle α between the guiding flap and the stabilizing plate. FIG. 5 is a front perspective view of the light clip 10. In FIG. 5, the stabilizing plate 12 would extend through the paper to define the horizontal plane. The guiding flap 14 extends downward from the stabilizing plate 12 and is visible due to the angle α formed between the flap and the plate.

Figure 6:
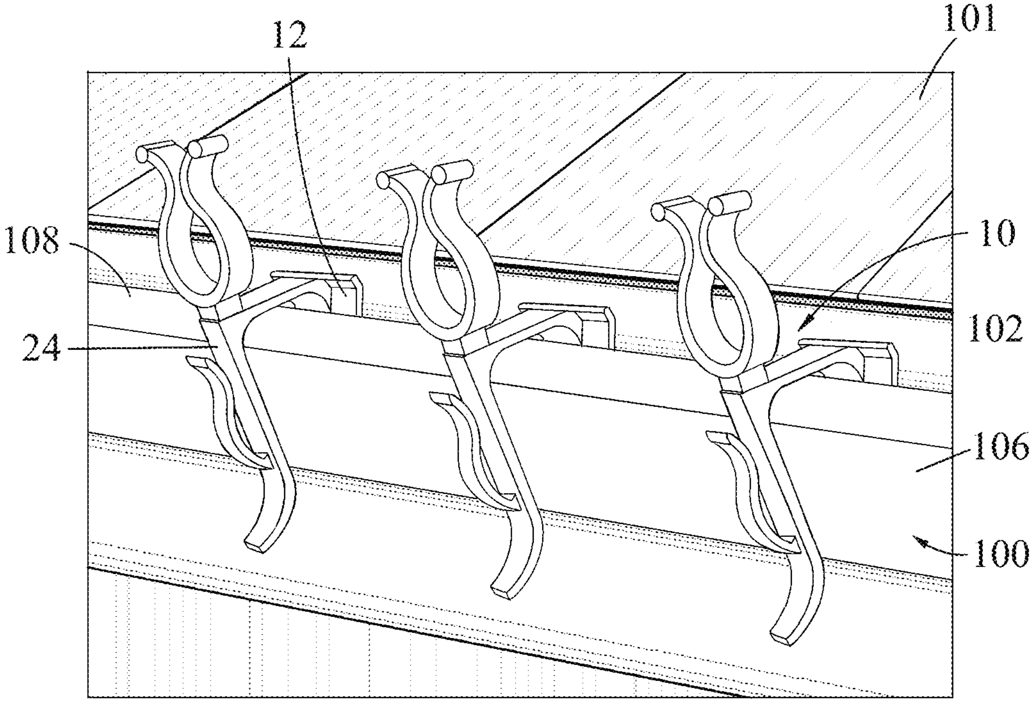
FIG. 6 is a perspective view of a plurality of light socket and cable clips according to one embodiment of the invention and demonstrating a first attachment method.

In use, the light clip 10 can be conveniently attached to a variety of surfaces, such as a gutter or shingle on a roof structure. For example, FIG. 6 is a perspective view of one embodiment of the light clip 10 removably attached to a gutter 100. As is conventional, the gutter 100 is typically three-sided and open on a top side to define an internal volume. The gutter 100 has an inner surface 102 that is attachable to a structure 101, e.g., a home or other type of building, and an outer surface 106 opposite the inner surface 102. A bottom surface integrally connects the inner surface 102 to the outer surface 106 to define the internal volume. Typically, an upper edge 108 of the outer surface 106 is exposed.

The light clip 10 may be removably attached to the gutter 100 by a user utilizing the means for clamping the light clip to a structure. This can involve a user biasing the flexure 24 away from the stabilizing plate 12. The light clip 10 is thereafter moved into position so that the upper edge may be positioned in the space created between the biased flexure 24 and the stabilizing plate 12. A user can then release the flexure 24, causing the outer surface 106 of the gutter 100 to be clamped between the flexure 24 and the stabilizing plate 12. In this manner of attachment, the multi-clip structure 22 is exposed on the outer surface 106 of the gutter 100. A plurality of light clips 10 can be positioned along the length of the gutter 100, as shown in FIG. 6. A light source can thereafter be removably attached to the light clips 10, as described above depending on the type of light source.

Figure 7:
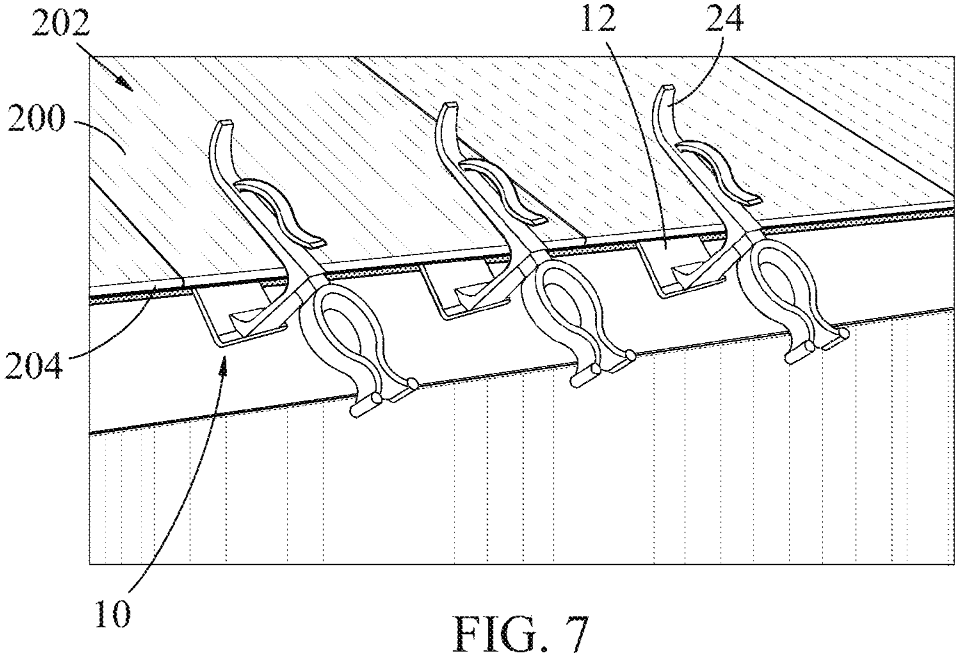
FIG. 7 is a perspective view of a plurality of light socket and cable clips according to one embodiment of the invention and demonstrating a second attachment method.

If a structure does not have a gutter 100 or other similar surface for receiving the light clip 10 as described with regard to FIG. 6, a user may still easily and conveniently attach the light clip to an alternative portion of the structure, e.g., a shingle on the roof FIG. 7 is a perspective view of a light clip 10 removably attached to a shingle 200. In some structures, such as residential homes, there is no gutter installed along the edge of the roof or only a portion of the roof will have gutters installed thereon. On such structures, the light clip 10 may be directly attached to a shingle 200 on the roof 202. As a result of the installation process, shingles 200 installed on a roof 202 will typically have a free-edge 204 that is not directly attached to the roof. To install the light clip 10 on roof 202, a user positions the guiding flap 14 under the free-edge 204 of the shingle 200. The user will thereafter bias the flexure 24 away from the stabilizing plate 12 to create an open space between the stabilizing plate 12 and the flexure. The shingle 200 is positioned in the open space and the light clip 10 is thereafter pushed forward so that the stabilizing plate 12 is substantially encumbered by the shingle 200. The angle α of the guiding flap 14 presses the stabilizing plate 12 into contact with an undersurface of the shingle 200, thereby increasing the frictional engagement of the light clip 10 with the shingle 200. In this manner of attachment, the multi-clip structure 22 is exposed on the top side of the shingle 200. A plurality of light clips 10 can be positioned on the roof 202, as shown.

In some embodiments, the light clip 10 is manufactured according to known injection molding techniques. In preferred embodiments, the light clip 10 is injection molded using a mixture of biodegradable materials, preferably a blend of natural and synthetic biodegradable polymers, and optionally, one or more fillers. Some examples of natural and synthetic biodegradable polymers that may be used include thermoplastic starch-based plastics ("TPS"), polyhydroxyalkanoates ("PHA"), polylactic acid ("PLA"), polybutylene succinate ("PBS"), and polycaprolactone ("PCL"). In preferred embodiments, the light clip 10 is injection molded using the Terratek® BD1219 or Terratek® BD4120 biodegradable polymer mixtures, manufactured and produced by Green Dot BioPlastics. These biodegradable polymer mixtures provide ideal characteristics of resilient flexibility, durability and have the added benefit of being environmentally friendly.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A clip for removably attaching one or more light sources to a structure, the clip comprising:

a stabilizing plate having a guiding flap at a first end and a post at an opposite second end;

a flexible multi-clip structure having a flexure extending from the post toward the guiding flap, the flexure having a handle curving away from and in resilient flexible contact with the stabilizing plate, means formed atop the flexure for removably attaching electrical wire and means extending from the post opposite the flexure for removably attaching a lightbulb socket, wherein the post integrally connects the flexible multi-clip structure to the stabilizing plate.

2. The clip of claim 1, wherein the clip is made from a biodegradable material.

3. The clip of claim 1, wherein the guiding flap is angled with respect to a horizontal axis defined by the stabilizing plate.

4. The clip of claim 3, wherein the guiding flap angles downward from the stabilizing plate.

5. The clip of claim 1, wherein the post is angled with respect to a horizontal axis defined by the stabilizing plate.

6. The clip of claim 5, wherein the angle of the post is between 45 to 85 degrees.

7. The clip of claim 5, wherein the post angles upwards from the stabilizing plate.

8. The clip of claim 1, wherein the electrical wire removable attachment means comprises a wire clamp extending from a top surface of the flexure.

9. The clip of claim 8, wherein the wire clamp further comprises a second handle extending therefrom.

10. The clip of claim 1, wherein the lightbulb socket removable attachment means comprises a socket clamp.

11. The clip of claim 10, wherein the socket clamp extends from the post and away from the stabilizing plate.

12. The clip of claim 11, wherein the socket clamp is integrally formed with the post.

13. The clip of claim 10, wherein the socket clamp comprises a pair of receiving wings enclosing a receiver.

14. The clip of claim 13, wherein the pair of receiving wings is configured to resiliently flex away from one another.

15. The clip of claim 14, wherein the receiver is configured to frictionally engage a lightbulb socket.

16. A biodegradable clip for attaching a variety of light sources to a structure, the biodegradable clip comprising:

a plate integrally formed with an angled guiding flap extending from a first end and a post extending from an opposite end; and a flexible multi-clip structure integrally formed with and extending from the post; wherein the flexible multi-clip structure comprises:

a socket clamp extending from the post in a first direction;

a flexure extending from the post in a second direction, opposite the first direction the flexure having a handle curving away from and in resilient flexible contact with the stabilizing plate; and a wire clip integrally formed on a top surface of the flexure.

17. The biodegradable clip of claim 16, wherein the post is configured to be resiliently flexible.

18. The biodegradable clip of claim 16, wherein the flexure is configured to resiliently contact the plate.

* * * * *